United States Patent
Quell et al.

(10) Patent No.: US 8,631,996 B2
(45) Date of Patent: Jan. 21, 2014

(54) COMPOSITE OF SHEET METAL PARTS

(75) Inventors: Ewald Quell, Fulda-Sickels (DE); Jochen Schneegans, Wittgert (DE); Jean Heussner, Lich (DE); Volker Stark, Huenfeld (DE); Yoshihiro Fujikawa, Aichi (JP); Takayuki Oidemizu, Aichi (JP)

(73) Assignees: Toyota Motor Corporation, Aichi (JP); FFT EDAG Produktionssysteme GmbH & Co. KG, Fulda (DE)

( * ) Notice: Subject to any disclaimer, the term of this patent is extended or adjusted under 35 U.S.C. 154(b) by 1062 days.

(21) Appl. No.: 12/523,559

(22) PCT Filed: Jan. 17, 2008

(86) PCT No.: PCT/EP2008/000326
§ 371 (c)(1),
(2), (4) Date: Nov. 16, 2009

(87) PCT Pub. No.: WO2008/087024
PCT Pub. Date: Jul. 24, 2008

(65) Prior Publication Data
US 2010/0062278 A1    Mar. 11, 2010

(30) Foreign Application Priority Data
Jan. 18, 2007 (EP) .................................. 07100752

(51) Int. Cl.
*B23K 31/02* (2006.01)
*B21D 39/02* (2006.01)
(52) U.S. Cl.
USPC ........................................ 228/173.6; 228/212
(58) Field of Classification Search
None
See application file for complete search history.

(56) References Cited

U.S. PATENT DOCUMENTS

| | | | | |
|---|---|---|---|---|
| 2,245,789 A | * | 6/1941 | Klavik | 280/786 |
| 3,406,440 A | * | 10/1968 | Trute | 29/892.3 |
| 3,530,029 A | * | 9/1970 | Lemelson | 425/506 |
| 3,719,980 A | * | 3/1973 | Van Bussel | 29/892.11 |
| 3,913,821 A | * | 10/1975 | Brandsma | 228/216 |

(Continued)

FOREIGN PATENT DOCUMENTS

| DE | 2913609 A1 | 10/1980 |
|---|---|---|
| DE | 4341255 A1 | 6/1995 |

(Continued)

OTHER PUBLICATIONS

International Search Report for PCT/EP2008/000326 filed Jan. 17, 2008, dated Mar. 27, 2008.

*Primary Examiner* — Kiley Stoner
(74) *Attorney, Agent, or Firm* — RatnerPrestia (57) ABSTRACT

A composite of sheet metal parts on or for a vehicle comprises a first sheet metal part forming a first outer shell region and comprising a first joining region which projects from the first outer shell region via a bent transition towards an inner side of the composite. The composite further comprises a second sheet metal part forming a second outer shell region and comprising a second joining region which projects from the second outer shell region towards the inner side of the composite, the second joining region facing the first joining region. The composite also comprises a welding or soldering seam along which the sheet metal parts are connected, wherein the seam runs along or alongside a flange edge formed in the first joining region at a distance from the first outer shell region, a flange deviating from the first joining region along the flange edge.

19 Claims, 7 Drawing Sheets

(56) References Cited

U.S. PATENT DOCUMENTS

| | | | | |
|---|---|---|---|---|
| 4,167,233 | A | * | 9/1979 | Hare .............................. 220/669 |
| 4,377,732 | A | * | 3/1983 | Preller .......................... 219/608 |
| 5,050,299 | A | * | 9/1991 | Rainville .................... 29/897.32 |
| 6,060,681 | A | | 5/2000 | Bachhofer |
| 6,679,417 | B2 | * | 1/2004 | Dziadosz et al. .......... 228/235.2 |
| 6,935,118 | B2 | * | 8/2005 | Gould et al. .................... 60/771 |
| 7,152,292 | B2 | | 12/2006 | Quell et al. |
| 2003/0093900 | A1 | * | 5/2003 | Huguet et al. ............. 29/890.03 |
| 2006/0288752 | A1 | | 12/2006 | Burzlaff et al. |
| 2010/0244497 | A1 | * | 9/2010 | Honda et al. ................. 296/205 |

FOREIGN PATENT DOCUMENTS

| | | |
|---|---|---|
| DE | 19705278 A1 | 2/1998 |
| DE | 10218986 A1 | 11/2003 |
| DE | 10338170 | 3/2005 |
| EP | 1 420 908 | 3/2003 |
| EP | 1454818 A1 | 9/2004 |
| EP | 1 685 915 | 8/2006 |
| JP | 60130462 A1 | 7/1985 |
| WO | WO-2004/014597 A1 | 2/2004 |

* cited by examiner

COMPOSITE OF SHEET METAL PARTS

This application is the U.S. national phase application of PCT International Application No. PCT/EP2008/000326, filed Jan. 17, 2008, which claims priority to European Patent Application No. EP 07 100 752.0, filed Jan. 18, 2007, the contents of such applications being incorporated by reference herein in their entirety.

BACKGROUND OF THE INVENTION

1. Technical Field

The invention relates to a composite of sheet metal parts formed by welding or soldering. It further relates to a joining method for sheet metal parts in which the sheet metal parts are connected to each other by welding or soldering and to a joining tool suitable for performing the joining method. The composite is part of a vehicle and forms part of an outer shell of the vehicle, preferably an automobile. It can be, for example, a fixedly assembled, i.e. integral, part of the vehicle body or, in particular, an attachment assembled or to be assembled to the vehicle body.

2. Description of Related Art

In order to weld or solder sheet metal parts to each other, the sheet metal parts are shaped with flanges and flange edges along which each of the flanges projects at an angle from an adjacent region of the sheet metal part. The sheet metal parts are fixed relative to each other in a joining position and connected to each other along the flange edges by welding or soldering. The sheet metal parts are conventionally shaped in a press by deep-drawing or the like. Problems are caused by bent flanges and generally by flanges which form an undercut for a plunger of the press. The definition of the flange edges in the longitudinal direction and in the local cross-sections of the edge influences the quality of the welding or soldering connection. Particularly in the manufacture of automobiles, welding and soldering connections are critical when the sheet metal parts connected in this way are visible from the outside. Irregularities in the welding or soldering seams require costly reworking or result in rejects.

SUMMARY OF THE INVENTION

It is an object of certain aspects of the invention to facilitate connecting sheet metal parts by means of welding or soldering and to improve the outer appearance of such a composite of sheet metal parts. Preferably, the quality of the connection is also improved.

One aspect of the invention proceeds from a composite and from a joining method in which a first sheet metal part and a second sheet metal part, and optionally also one or more additional sheet metal parts, are connected to each other by welding or soldering.

In the assembled state, i.e. when the composite forms part of an outer shell of a vehicle, the first sheet metal part forms a first region of the outer shell and the second sheet metal part forms a second region of the outer shell, which are referred to in the following as first and second outer shell regions. The first outer shell region and the second outer shell region are visible from outside of the vehicle, so the outer appearance of the transition between the first outer shell region and the second outer shell region is critical.

According to another aspect of the invention, the first sheet metal part comprises a first joining region which projects from the first outer shell region away from the outside surface of the first outer shell region towards an inner side of the composite. The first joining region projects from the first outer shell region via a bent transition. The bent transition is preferably a sharp edge along which the first joining region is deviating from the first outer shell region at an angle of less than 180° and preferably more than 30°. The joining region can project from the first outer shell region at an angle preferably in the range of 30° to 120°. The second sheet metal part comprises a second joining region which projects from the second outer shell region also towards the inner side of the composite and faces the first joining region, so the sheet metal parts are disposed such that the two joining regions are face to face. The joining regions overlap each other inside from the outer shell regions, at least partially. The welding or soldering seam runs in a distance from the outer shell regions. The seam cannot be seen or cannot so easily be seen from the outside. The invention creates the connecting seam as a hidden seam. The appearance of the seam as such is no longer critical.

In the joining method, the sheet metal parts are fixed relative to each other in a joining position. In the joining position, the first joining region abut the second joining region, such that a butt joint is obtained at least along a strip of the joining regions, or the joining regions oppose each other at a slight distance. The joining regions are shaped to follow each other in the longitudinal direction of the bent transition, thus conforming one to the other, either in contact or at a slight distance. The sheet metal parts in the joining position are connected to each other in the joining regions by welding or soldering, preferably by means of a welding or soldering seam which extends at least over most of the length of the transition of the sheet metal parts, preferably continuously.

The first sheet metal part deviates along a flange edge running in the first joining region, such that a flange projects along the flange edge and encloses an angle of less than 180° and preferably more than 30° with the sheet metal region bordering the other side of the flange edge. The flange edge along which the sheet metal parts are connected is formed in the first joining region in a distance from the first outer shell region. The cross-section of the flange can be linear or in principle also curved over its entire height as measured onto the flange edge or only in the immediate vicinity of the flange edge. A sharp flange edge with only a small curvature radius is advantageous. The sheet metal parts are fixed relative to each other in the joining position. In said joining position, the sheet metal parts abut each other along the flange edge, such that a butt joint is obtained along the flange edge, or they oppose each other along the flange edge at a slight distance as measured onto the flange edge. The second sheet metal part is shaped to follow the contour of the flange edge in the longitudinal direction, thus conforming to the flange edge, either in contact or at a slight distance. The sheet metal parts in the joining position are connected to each other alongside or preferably along the flange edge by welding or soldering, preferably by means of a welding or soldering seam which extends at least over most of the length of the flange edge, preferably continuously.

It is advantageous if the seam runs along the flange edge. However, the flange edge can serve only as a rough orientation for the seam. In such embodiments, although most preferred, the seam runs in a short distance from the flange edge, preferably parallel to the flange edge. In principal, however, the seam may run anywhere between the flange edge and the bent transition formed between the first outer shell region and the first joining region as long as it is hidden, i.e. as long as it does not reach to the bent transition of the first sheet metal part and also not to the bent transition of the second sheet metal part. The seam may be, for example, wound. As in the other embodiments, the seam runs at a distance from the outer shell regions so that it can not be seen from outside. To hide the seam even more secure, the joining regions preferably abut each other and form a very narrow gap between the seam and the outer shall regions. This is, however, advantageous also for all other embodiments.

A flange edge with a projecting flange is advantageous in order to predefine the seam accurately or to stiffen any of the sheet metal parts in its joining region.

Preferably, the flange deviates away from the second joining region. The composite is bifurcated in its cross-sectional profile in the vicinity of the connecting seam. The flange of the first sheet metal part and the second joining region form a funnel with the seam forming a funnel tip. The second sheet metal part is preferably provided with a second flange edge in the second joining region although the second joining region can simply be straight or smoothly curved at the height of the seam when seen in cross-section.

The first joining region can advantageously be a peripheral strip of the first sheet metal part deviating along the bent transition which preferably is a sharp edge with a small radius of curvature. The flange edge shaped in accordance with the preferred embodiment of the invention can be orientated in any way with respect to the bent transition, but can in particular run parallel to the transition. The flange is preferably folded in the same angular direction in which the joining region also projects from the adjacent first outer shell region. By flanging in accordance with the invention, the flange can be folded relative to the joining region by for example 30°, 45° or 90°, or as applicable also by a greater angle or by a value in between. In one variant, both the bent transition at which the joining region projects from the adjacent sheet metal region and the flange edge running within the joining region are shaped by flanging. If the second sheet metal part also comprises such a joining region, along which it is placed facing and preferably abutting the joining region of the first sheet metal part, and if the sheet metal parts are thus fixed relative to each other in the joining position, then in preferred embodiments, the flange of the first sheet metal part, which is angled away from the joining region, forms a funnel, as viewed in cross-section, together with the joining region of the second sheet metal part which is preferably also a peripheral strip. In order to further improve the welding or soldering result, the joining region of the second sheet metal part is advantageously also flanged in accordance with the invention, such that the sheet metal parts are fixed facing each other via the joining regions and the two flanged flanges point away from each other, preferably in a V-shape, wherein the joining regions preferably abut each other. The flange edges of the sheet metal parts oppose each other at a small distance or abut each other. An exactly defined, preferably narrow joint gap is obtained immediately at or above the flange edges along the entire flange, such that an accurate, uniform welding or soldering seam can be produced.

The sheet metal parts can each be formed in a press by plastic deformation, for example deep-drawing, embossing or the like, including the flange of the first sheet metal part and the optional flange of the second sheet metal part. The shaped sheet metal parts are fixed one relative to the other in a joining position such that the joining regions are face to face forming a narrow gap therebetween, preferably abutting each other at least along a line, preferably along a strip. The gap, line or strip runs between the bent transition of the first sheet metal part and the welding or soldering seam. The narrow gap or the abutment strip extends preferably from the connecting seam up to the bent transition along which the first joining region projects from the first outer shell region.

The flange of the first sheet metal part and also the optional flange of the second sheet metal part can be shaped, alternatively, by flanging after the outer shell region has been shaped in a preceding shaping process of plastic deformation, for example in a deep-drawing press.

Flanging is preferably carried out by means of a flanging element which moves in the longitudinal direction of the flange edge and is pressed against the flange during this movement, preferably permanently when moved from one end to another end of the flange edge. The flange is thus folded around the flange edge progressing in the longitudinal direction. During flanging, the flanging element is preferably moved continuously forwards along the flange edge. A flange edge can already be present before flanging, and the flange merely folded further around said flange edge. Flanging is however also particularly suitable for folding a flange around a flange edge which is to be created for the first time by flanging. If, as is preferred, the sheet metal parts are already provided for flanging as three-dimensionally curved structures which can also comprise one or more dents, cavities, three-dimensional corner regions or the like, both shaping for the first time and subsequently shaping the flange edge, and—as applicable—the flange, relieves the preceding plastic deformation process, in particular in cases in which the sheet metal part has been shaped in a press and an undercut is created by the finished flange. Using a flanging process in which the flanging element is moving in the longitudinal direction of the flange edge to be shaped, it is possible to shape around different, even non-parallel axes and thus to shape around flange edges bent in almost any way.

The precision which such flanging provides for shaping the flange edge and the flange is also particularly advantageous, in particular for flange edges which describe one or more bends. This is substantiated by the fact that flanging acts on the sheet metal part in a local zone which is spatially limited with respect to the entire length of the flange edge, and that due to the flanging, a tension state which benefits the exactness of plastic shaping prevails at the effective location. Furthermore, the flange can be gently folded in a number of steps, for example in two steps by an angle in the range of 20° to 45° in each of the two steps. The flange is preferably flanged in a single step or in two steps, in order to minimise the processing time. The individual flanging steps can be performed in separate runs of the same flanging element which travels the flange in a different angular position in each case, or by a number of flanging elements which differ in terms of their shape or angular position. A number of flanging steps can also be performed in a single run by two or, as applicable, even more flanging elements which jointly travel the flange in the longitudinal direction, consecutively but in the same run, and are attached preferably rotatably attached, to the same tool head. EP 1 685 915 A1 describes a preferred flanging tool for this. Several flanging elements can also be arranged on a tool head such that each of these flanging elements can be moved into an operative position automatically while at least one other or several other flanging elements is/are in an inoperative position. The tool head comprises in such embodiments at least two parts one of which is moveable relative to the at least one other and carries one or more of the flanging elements. EP 1 420 908 B1 discloses examples of such embodiments.

The flange can be particularly gently folded by roll-flanging. In preferred embodiments, the flanging element is accordingly a flanging roller. In principle, however, the flanging element can also be a sliding piece which only slides on the flange in the longitudinal direction during flanging, the flange being folded, so to say, by slide-flanging. If the flange is folded in a number of flanging steps, each of the steps is preferably a roll-flanging step using a flanging roller.

Flanging can alternatively be carried out by means of a flanging element which moves transversely to the longitudinal direction of the flange edge in order to fold the flange around the flange edge. The flanging element is a flanging die which extends parallel to the flange edge over a greater length of the flange edge, preferably over most or all of the length of the flange edge. This flanging is preferably an embossing operation.

The joining region in which the flange edge which defines the course of the welding or soldering seam runs can be likewise produced by flanging only subsequently, after the sheet metal part has been shaped by a process of plastic deformation, for example in a deep-drawing press or other press. This further relieves the preceding shaping process. Furthermore, the sheet metal parts in question can be more densely stacked on top of each other.

The sheet metal parts can be fixed relative to each other stationary and the flanging element be moved transversely to the longitudinal direction of the flange edge to be formed or, preferably, advancing along the flange edge in the longitudinal direction. Alternatively, the flanging element can be kept stationary and a fixing tool which fixes the sheet metal parts relative to each other is moved transversely to the flange edge or longitudinally following the course of the flange edge to be formed, or to be more precise, prescribing the course of the flange edge. An example of the latter alternative in which the flanging element is kept stationary is disclosed in DE 103 38 170 C. Also for welding or soldering either the fixing tool for the sheet metal parts or the welding or soldering means can move and the other be kept stationary at the working station. Specifying that the flanging element or the welding or soldering means is moved relative to the respective sheet metal part or the two or more sheet metal parts encompasses both alternatives and also alternatives in which both, the flanging element or the welding or soldering means and also the fixing tool are moved in a mutually coordinated manner.

A particularly accurate, well-defined flange edge is obtained if the flange is folded around an edge of a contoured body. The contoured body can be part of a flanging tool and can be moved along the flange together with the flanging element if such is moved along the flange progressing in the longitudinal direction, wherein the flanging element and the contoured body forming part of the flanging tool form a gap between each other, in which they clamp the flange. The flow of force is closed within the flanging tool, as with a pair of tongs, and as is known from flanging tools in principle. In such embodiments, the contoured body can in particular be a counter roller for the flanging element. In likewise preferred, alternative embodiments, the contoured body is stationary relative to the first sheet metal part during flanging, such that the flanging element also moves forwards along the flange relative to the contoured body. Such embodiments are also suited for the flanging with a flanging die. The stationary contoured body comprises an edge extending in the longitudinal direction of the flange, the contour of this edge corresponds to the course of the flange edge to be formed. The entire course of the flange edge can be predefined by a number of such contoured bodies arranged adjacently in the longitudinal direction of the flange, or by a single contoured body extending over the entire length of the flange. In the region of the flange edge, the flange constantly abuts the edge of the contoured body during folding and is so to speak drawn around the edge.

In preferred embodiments, the flanging element presses the flange onto a bearing surface area of a contoured body. If the flange is folded in a number of steps, it is pressed onto the bearing area in the final step. The contoured body can be stationary relative to the first sheet metal part. Pressing onto the bearing area of a contoured body is however also understood to include clamping against a contoured body which is moved together with a flanging element advancing in the longitudinal direction of the flange. The flange is particularly preferably folded around the edge of the aforementioned contoured body and, at the end of flange-shaping, pressed down onto the same contoured body, which in such cases forms both the abutment edge when folding the flange and the bearing area at the end of flange-shaping.

In advantageous embodiments, the first sheet metal part is fixed, preferably clamped, by means of the contoured body for the flanging and preferably also for the subsequent welding or soldering. The contoured body, together with a counter support, accordingly forms a fixing tool for the first sheet metal part. If one or more additional such contoured bodies is/are arranged along the flange edge, the contoured body forms the fixing tool for the first sheet metal part together with the counter support and the one or more additional contoured bodies and, as applicable, one or more additional counter supports for the one or more additional contoured bodies.

Forming the flange edge and the flange in an extra flanging step by means of a flanging element which moves in the longitudinal direction of the flange edge or transversely thereto is advantageous for producing composites of sheet metal parts by welding or soldering in general and not only for creating and joining the sheet metal parts to a composite with the claimed geometry or the claimed orientation with respect to outside and inside. However, such a flanging and subsequent welding or soldering is particularly well suited for producing the composite of the present invention.

Under the aspect of forming the flange edge(s) and flange(s) in an extra flanging step, the subject of the invention also includes a composite of sheet metal parts as such, which consists of at least two sheet metal parts, namely a first sheet metal part comprising a flange edge shaped by flanging and along which a flange projects, and a second sheet metal part which is connected to the first sheet metal part by means of a welding or soldering seam extending along the flange edge. The second sheet metal part preferably also comprises a flange edge shaped by flanging, and the seam also extends along this flange edge, i.e. from flange edge to flange edge as viewed in cross-section. The flange edge of the second sheet metal part can likewise be shaped by flanging, preferably as disclosed with respect to the first sheet metal part. The composite of sheet metal parts can in particular be manufactured using the method in accordance with the flanging alternative of claim 7. The fact that the flange or number of flanges has been folded by flanging can for example be seen from the surface of the respective flange on which the longitudinally advancing flanging element leaves behind the streaks which are typical of flanging if the flange has not been worked after flanging. With flanging, the metal sheet is more uniformly loaded than for example when folded in a folding press or when embossed or deep-drawn in a press, such that the material microstructure of low crack density of the metal sheet continues more uniformly into the flanged edge than in the other deforming processes cited by way of example. In many cases, this can even be seen with the naked eye, or at least under the microscope. Furthermore, the flanged flange edge is particularly well-defined, i.e. it exhibits the same course from sheet metal part to sheet metal part and also the same cross-sectional shape at the same location along its course. The quality of the seam and of the connection as a whole can be further increased if the sheet metal parts are flanged in the joining position, preferably in the same run of the flanging tool and even more advantageously using the same flanging element. The welding or soldering tool is placed and moved along the flange edge, producing the connecting seam, preferably by adding welding or soldering material, while the fixation of the flanging process is maintained. Flanging can be followed by welding or soldering, without any intermediate step.

The sheet metal parts can be shaped, preferably completely shaped including the flange edge or edges, separately from each other, fixed relative to each other in the joining position in a fixing tool of a laser or soldering means, and welded or soldered along the flange edge. In a preferred development, the first sheet metal part is flanged and, once flanged, is permanently and fixedly connected, without re-fixing, to the second sheet metal part and optionally to one or more additional sheet metal parts by welding or soldering in the same fixing tool, in order to not have to fix the first sheet metal part in a first fixing tool for flanging in accordance with the invention and again in a different, second fixing tool for welding or soldering. In a first variant, the first sheet metal part is initially fixed and flanged on its own. After this flanging, the second sheet metal part is fixed in the joining position relative to the first sheet metal part which is still fixed, and the sheet metal parts in the joining position are then connected to each other by welding or soldering. This variant can in particular be used when flanging does not produce a flange edge on the second sheet metal part for welding or soldering, although it can also be embodied in such cases. If flange edges for welding or soldering are flanged on both sheet metal parts, a fixing tool for the first sheet metal part and a fixing tool for the second sheet metal part can be provided separately for flanging in each case, in order to fix the flanged sheet metal parts in the joining position by means of the same two fixing tools without re-fixing them. In a particularly advantageous second variant, the first sheet metal part and the second sheet metal part, and as applicable one or more additional sheet metal parts, are fixed in the joining position relative to each other, the flange edges required for welding or soldering are flanged, and the sheet metal parts are fixedly connected to each other by welding or soldering along the flange edges thus produced, without being re-fixed. The second method variant is also advantageous in cases in which not all the sheet metal parts to be connected to each other are flanged, but only for example the first sheet metal part. The second variant is also advantageous if the sheet metal parts are fixed in the joining position relative to each other in a fixing tool and only flanged, the fixation is released, and the sheet metal parts are fixed in a different fixing tool or fixed again in the same fixing tool at a later time and welded or soldered to each other.

Fixing at least one of the sheet metal parts to be connected to each other directly in the fixing tool of a joining means, such as for example a welding or soldering means, is generally advantageous in the series production of composites of sheet metal parts if at least one of the sheet metal parts of the composite has to be specially shaped for the respective connecting technique. The Applicant therefore reserves the right to direct a separate application to a joining method without re-fixing, wherein while welding and soldering are preferred connecting techniques and flanging is a preferred shaping technique, the concept of the invention is not however limited to these techniques. Thus, flanging according to the present invention can be replaced by a different process of plastic deformation, for example by a different bending process such as for instance simple folding with a tool which is stationary with respect to the sheet metal part and does move only transversely to the longitudinal direction of the flange edge, if the geometry of the flange edge and flange to be produced allows this. Instead of welding or soldering, the sheet metal parts can for example be glued or riveted to each other.

Within welding or soldering methods, laser welding and laser soldering are preferred. Gas-shielded welding is another preferred welding method. Welding is preferably performed by adding welding material, in particular welding wire, but can in principle also be performed without added material.

Aspects of the invention are advantageous for series production in the manufacture of vehicles, for land, water and air craft, but in particular for the manufacture of automobiles. In principle, however, it is not limited to the manufacture of vehicles. In the manufacture of automobiles, high demands are made on the quality of welding and soldering connections which form part of the outer shell of an automobile, for example moving attachments such as doors, engine hoods, trunk lids and hatchbacks or fixedly assembled autobody metal sheet. In addition to stability and resistance to corrosion, an immaculate optical appearance is also demanded. A composite of sheet metal parts manufactured in accordance with the invention meets these demands to a high degree.

Another aspect of the invention further relates to a device for joining sheet metal parts, comprising a fixing tool, a flanging tool, a welding tool or soldering tool, one or more spatially moving actuators and a control means for the actuator or actuators and the welding or soldering tool.

The fixing tool is designed such that it can fix at least one sheet metal part, on which the flange edge is shaped in accordance with the invention, in a processing position suitable for flanging. The fixing tool advantageously comprises the described contoured body for this. It is preferably also used for fixing said sheet metal part during welding or soldering. In principle, a separate fixing tool can also be provided in each case for fixing during flanging and for fixing during welding or soldering. If a flange edge is also to be shaped by flanging on the at least one other sheet metal part, the device also comprises a fixing tool for this, to which the above statements similarly apply. In preferred embodiments, the fixing tool has all the fixing elements and contoured bodies required for fixing the sheet metal parts for welding or soldering and for flanging, wherein the contoured body or bodies can also form one or more fixing elements in a dual function.

The flanging tool comprises a tool head comprising the flanging element. The flanging element is preferably a flanging roller which is rotatably mounted on the tool head. If flanging is performed in a number of runs, an additional such flanging tool can be provided, or an additional such flanging element on the same tool head. The flanging elements can differ in shape or in their angular position when travelling the flange, which also includes a combination of such differences. A flanging roller can be a simple cylinder roller or can taper towards one axial side, i.e. can exhibit a diameter which decreases in the direction of one end-facing side of the roller. In accordance with preferred embodiments, the diameter is at its greatest in an axially central region and decreases in the direction of both end-facing sides. The roller can in particular be shaped like a double truncated cone. Instead of a conical taper, the flanging roller can also be tapered with a progressive or degressive curvature in the direction of one or both axial end-facing sides. Using such a flanging roller, a flange of the first sheet metal part and a flange of the second sheet metal part can advantageously be folded in a single run of the flanging tool. In the generalised case of a non-rotatable flanging element, such a flanging element comprises a flanging area via which it presses against the respective flange during flanging and which tapers away from a central region, transverse to the direction of movement during flanging, to one—preferably, both—sides of the respective sheet metal part. If the flange or flanges is/are folded in a number of steps, from step to step further, such a flanging element is advantageously provided for each of the steps to be performed successively, wherein the steepness with which the respective flanging area tapers away from the respective sheet metal part towards the sides is different in each of the flanging elements. The steepness decreases from flanging step to flanging step, i.e. the flanging area for the step to be performed first exhibits the greatest steepness and the flanging area for the final step exhibits the smallest steepness.

In an advantageous embodiment, the device comprises an actuator for the flanging tool and an actuator for the welding or soldering tool. The tools can also be arranged on the same actuator exchangeable one against the other by means of a coupling. If the device comprises a number of flanging elements, each arranged on a different tool head of its own, a separate actuator can be provided for each of these tool heads or the tool heads can be arranged interchangeably on the same actuator. As already mentioned, a number of flanging elements can however also be arranged on the same tool head. The actuator or the several actuators is/are preferably arms of one or more robots.

Alternatively, an actuator can be provided for the fixing tool to move the respective sheet metal part or the sheet metal parts already fixed relative to each other during the flanging step or the welding or soldering step including moving the fixing tool for flanging and welding or soldering as well.

The control means is coupled to the actuator or number of actuators and to the welding or soldering tool and is equipped to control the movement of the actuator or number of actuators and to control the welding or soldering process, such that the method in accordance with the invention can be performed automatically under the conditions of series production. When the method is performed, the control means controls the actuator or number of actuators such that the respective tool is moved along a predefined path which corresponds to the course of the flange edge to be shaped. The path is stored in a memory of the control means, wherein the control means is preferably adaptive, in order to be able to automatically alter the stored co-ordinates on the basis of experimental values in series production. The path can be stored in the form of co-ordinates in a spatial co-ordinate system which is stationary with respect to the site of the device. If flanging is performed at a different location to welding or soldering, the path as such is the same in each case. Only the co-ordinate system in which the path is predefined is shifted and/or rotated.

BRIEF DESCRIPTION OF THE DRAWINGS

The invention is explained below on the basis of example embodiments. Features disclosed by the example embodiments, each individually and in any combination of features, advantageously develop the subjects of the embodiments described herein. There is shown.

DETAILED DESCRIPTION OF THE PREFERRED EMBODIMENTS

Figure 1:
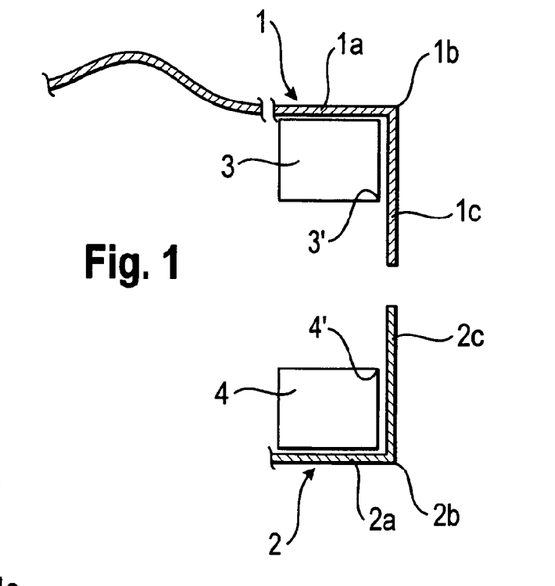
FIG. 1 two sheet metal parts for a composite of sheet metal parts of a first example embodiment, each fixed in a processing position for flanging.

FIG. 1 shows a first sheet metal part 1, clamped in a processing position by means of a contoured body 3, and a second sheet metal part 2, likewise clamped in a processing position by means of another contoured body 4. Flange edges on the sheet metal parts 1 and 2 are shaped, along which the sheet metal parts 1 and 2 are then welded to each other to form a composite of sheet metal parts. FIG. 1 shows a sheet metal region 1*a*, 1*b*, 1*c* and 2*a*, 2*b*, 2*c* of each of the sheet metal parts 1 and 2, in which in each of the sheet metal parts 1 and 2, the respective flange edge and a flange are shaped, said flange projecting along the respective flange edge up to and including an outer periphery of the sheet metal part 1 or 2. The sheet metal parts 1 and 2 have been finally shaped, except for the flange edges still to be shaped, in a conventional process of plastic deformation, for example deep-drawing, in a press. In their sheet metal region 1*a-c* and 2*a-c* provided for connecting, the sheet metal parts 1 and 2 each comprise a peripheral strip-shaped joining region 1*c* and 2*c* which projects from the adjacent sheet metal region 1*a* and 2*a* at an angle. The two peripheral joining regions 1*c* and 2*c* are linear in the cross-section, but could also be cross-sectionally curved. Instead of along a sharp edge or transition 1*b* and 2*b* as in the example embodiment, the sheet metal parts 1 and 2 could also transition, smoothly curved, into the joining region $1c$ or $2c$. The height of the joining regions $1c$ and $2c$, measured onto the edge in each case, can be constant or can vary in the longitudinal direction of the edge.

The contoured bodies 3 and 4 are fixing bodies of a fixing tool which fixes the sheet metal parts 1 and 2 in the processing position. The contoured body 3 clamps the sheet metal part 1 in the sheet metal region $1a$ adjacent to the peripheral joining region $1c$, against a counter support (not shown), and the contoured body 4 clamps the sheet metal part 2 in the sheet metal region $2a$ adjacent to the peripheral joining region $2c$, against another counter support (also not shown). The flange edges are shaped within the joining regions $1c$ and $2c$ by folding the outer periphery of each of the sheet metal parts 1 and 2, namely the outer periphery of each of the joining regions $1c$ and $2c$, around an edge $3'$ or $4'$ of the assigned contoured body 3 or 4, the periphery of the sheet metal part 1 around the edge $3'$ of the contoured body 3 and the periphery of the sheet metal part 2 around the edge $4'$ of the contoured body 4. The edges $3'$ and $4'$ of the contoured bodies 3 and 4 predefine the course of the respective flange edge in the longitudinal direction and the cross-sectional profile. Each of the contoured bodies 3 and 4 is already in contact, before folding, with the peripheral joining region $1c$ or $2c$ along its contoured body edge $3'$ or $4'$ which defines the course of the respective flange edge. The contoured bodies 3 and 4 are each arranged in an inner region of the sheet metal part 1 or 2 between the joining region $1c$ or $2c$ and the adjacent sheet metal region facing the respective joining region $1c$ or $2c$.

Figure 2:
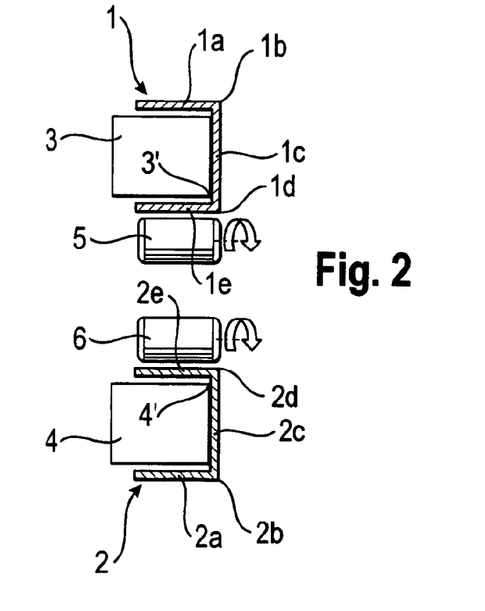
FIG. 2 the flanged sheet metal parts.

FIG. 2 shows the sheet metal parts 1 and 2, still fixed in the processing position, after the respective periphery has been folded. The flange edges shaped by folding are indicated by $1d$ and $2d$. The folded periphery of the sheet metal part 1 forms a flange $1e$ deviating along the flange edge $1d$, and the folded periphery of the sheet metal part 2 forms a flange $2e$ deviating along the flange edge $2d$.

The flange edges $1d$ and $2d$ are shaped in a number of steps by roll-flanging. During roll-flanging, a flanging roller rolls off on the periphery or flange $1e$ in the longitudinal direction and folds the flange $1e$ continuously progressing in the longitudinal direction around the flange edge $1d$, for example by an angle of 45°. After this first flanging step, the flange $1e$—which previously extended the peripheral joining region $1c$ without deviation, extending in the example embodiment in a linear extension of the joining region $1c$—points in the corresponding angle, by way of example the 45° cited, with respect to the adjacent region of the joining region $1c$. In a second step, the flange $1e$ is then folded further by an additional angle around the flange edge $1d$ previously shaped in the first step, and pressed against the contoured body 3 which forms a bearing surface for the flange $1e$. The sheet metal part 1 is thereby finally flanged. The sheet metal part 2 is similarly flanged around the flange edge $2d$.

FIG. 2 shows the sheet metal parts 1 and 2, still in the processing position, after the final flanging step, after which the flanges $1e$ and $2e$ abut the contoured bodies 3 and 4. Cylindrical completion flanging rollers 5 and 6 are shown, which have been used for folding the flanges $1e$ and $2e$ in the final flanging step.

The edges $3'$ and $4'$ of the contoured bodies 3 and 4 are parallel to each other. The flanging rollers, including the completion flanging roller 5, are rotatably attached to a common tool head for each sheet metal part 1, wherein by adjusting said tool head, it is possible to optionally move the flanging rollers (and thus each of the flanging rollers in question) into a working position for its/their run. The flanging rollers for each sheet metal part 2, including the completion flanging roller 6, are similarly arranged jointly on another tool head for each sheet metal part 2. The two tool heads are each attached to one end of a spatially moving robot arm which is automatically controlled by a control means along a predefined path which corresponds to the course of the shaping edge $3'$ or $4'$ of the contoured body 3 or 4, such that the flanging rollers roll off along the edge $3'$ or $4'$, respectively. Alternatively, the flange edges $1d$ and $2d$ can also be shaped in the same run using two flanging rollers arranged on the same tool head, or successively using the same flanging rollers for both types of sheet metal parts 1 and 2. In the first case, the sheet metal parts 1 and 2 have to be compatibly arranged relative to each other. In the second case, either the tool head is attached in a different angular position on the same robot arm after the first sheet metal parts 1 have been flanged, or the control means automatically switches the robot arm from flanging one type of sheet metal part 1 or 2 to flanging the other type of sheet metal part 2 or 1. The path is the same for each of the sheet metal parts 1 and 2, if a Cartesian co-ordinate system is suitably selected which is fixed with respect to the respective sheet metal part 1 or 2.

Figure 3:
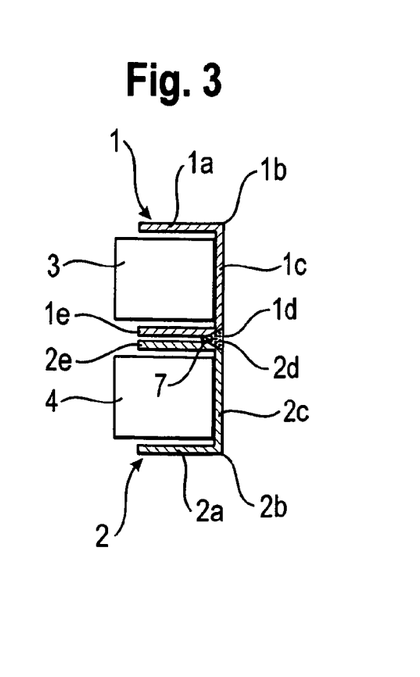
FIG. 3 the sheet metal parts fixed in a joining position and connected to each other by welding to form the composite of sheet metal parts.

Once flanged, the first sheet metal part 1 and the second sheet metal part 2 are positioned in a joining position relative to each other, in which the flanges $1e$ and $2e$ abut each other. Due to their small curvature radius, the flange edges $1d$ and $2d$ also almost abut each other, such that only a narrow joint gap remains. The sheet metal parts 1 and 2 are welded to each other in the butt joint thus formed in the joining position. A laser welding tool is used for welding which is attached to a robot arm and is moved, controlled by the control means, continuously forwards along the joint and thus along the flange edges $1d$ and $2d$. The tool also preferably fine-tunes itself by additionally scanning the joint with tactile or other sensors. During the forward movement, the laser welding tool constantly feeds additional material into the joint gap and continuously melts it off by means of a laser. This produces a narrow welding seam 7 which bridges the joint gap and connects the sheet metal parts 1 and 2 fixedly to each other, wherein the adjacent sheet metal material is melted on.

The fixing tool comprises two fixing halves. One fixing half, comprising the contoured body 3 and its counter support, clamps the sheet metal part 1, while the other fixing half, comprising the contoured body 4 and its counter support, clamps the sheet metal part 2. For flanging, the fixing halves each assume a processing position in which they are moved away from each other in order to create space for simultaneously flanging the sheet metal parts 1 and 2. After flanging, the fixing halves move towards each other, controlled by the control means, until both fixing halves and the sheet metal parts 1 and 2, still fixed, each assume a joining position in which the sheet metal parts 1 and 2 together form the joint gap for the welding seam 7. FIGS. 1 and 2 show the fixing halves in the processing position suitable for flanging, and FIG. 3 shows the fixing halves in the joining position. The processing position is selected relative to the joining position such that the fixing halves can be moved a short distance from one position to the other, by means of a simple back-and-forth movement which can in particular be a linear movement. For changing from one position to the other, it is sufficient if only one of the fixing halves is moved. The other can be arranged stationary in its joining position.

Figure 4:
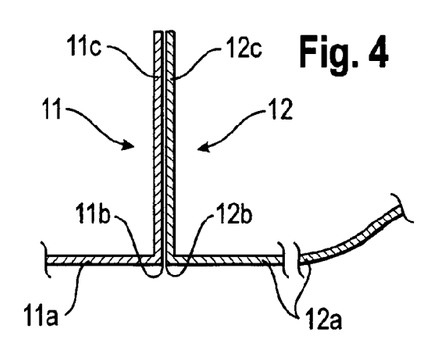
FIG. 4 two sheet metal parts for a composite of sheet metal parts of a second example embodiment.
Figure 5:
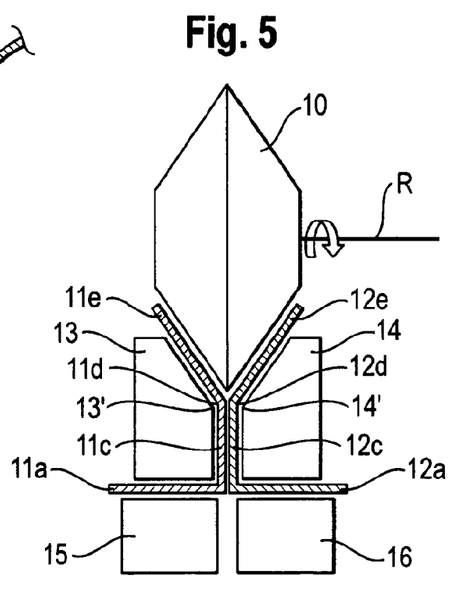
FIG. 5 the sheet metal parts of the second example embodiment, fixed in a joining position and flanged in the joining position.
Figure 6:
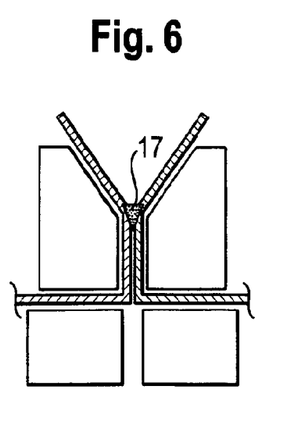
FIG. 6 the sheet metal parts of the second example embodiment, fixed in the joining position and connected to each other by welding to form the composite of sheet metal parts.

FIGS. 4 to 6 show the manufacture of a composite of sheet metal parts 11 and 12, in a second example embodiment in which the first sheet metal part 11 and the second sheet metal part 12 are again connected to each other by welding. The sheet metal parts 11 and 12 each comprise a peripheral strip-shaped joining region $11c$ and $12c$ which deviates at an angle from a shell-shaped sheet metal region 11a and 12a of the respective sheet metal part 11 or 12 which has a greater area as compared to the peripheral joining region 11c or 12c. This other sheet metal region 11a and 12a respectively can, in addition to one or more large curvature(s), also comprise dents or other peculiarities of shape. In this respect, the sheet metal parts 11 and 12 correspond to those of the first example embodiment.

In the second example embodiment, the sheet metal parts 11 and 12 are already fixed in the joining position relative to each other for flanging, and also assume this position for the subsequent welding. FIG. 4 shows the sheet metal parts 11 and 12 in the joining position before being flanged and without a fixing tool. FIG. 5 shows the sheet metal parts 11 and 12, fixed in the joining position, after flanging. The sheet metal parts 11 and 12 are fixed in the joining position, abutting each other uniformly over the areas of the two peripheral joining regions 11c and 12c adjacent to the bent transitions 11b and 12c, by clamping the sheet metal part 11 in the sheet metal region 11a adjacent to the peripheral joining region 11c, between a contoured body 13 and a counter support 15, and clamping the sheet metal part 12 in the sheet metal region 12a adjacent to the peripheral joining region 12c between a contoured body 14 and a counter support 16. The joining regions 11c and 12c are shaped, adjacent to the bent transitions 11b and 12b, to be adapted to each other in all cross-sections, such that they are at least substantially parallel to each other, without tension, in each cross-section.

A flange edge 11d and 12d is shaped by roll-flanging in each of the abutting joining regions 11c and 12c, by folding an outer periphery of the joining region 11c or 12c away from the opposing outer periphery of the other joining region 12c or 11c. The edges 13' and 14' of the contoured bodies 13 and 14, which in the joining position oppose each other in parallel at the same height over the entire course, again define the contour of the flange edges 11d and 12d, by folding the joining region 11c around the edge 13' and folding the joining region 12c around the edge 14' and so obtaining a deviating peripheral flange 11e and 12e in each case. The flanges 11e and 12e cross-sectionally point towards each other in the shape of a funnel, in the example embodiment in a V-shape, up to the flange edges 11d and 12d, such that the flange edges 11d and 12d and the narrow joint gap remaining between the flange edges 11d and 12d form a tip of the funnel. The flanges 11e and 12e are each folded relative to their peripheral strip region by an angle of at most 45° in the direction of the other sheet metal region of the respective sheet metal part 11 or 12, in the example embodiment by 30°, i.e. the joining region 11c or 12c and the flange 11e and 12e deviating from it deviate in the same angular direction. Flanging by angles up to about 45° can be performed in a short cycle time in a single flanging step, i.e. in a single run of a flanging roller, which is particularly advantageous for series production but still gentle on the sheet metal material. In order to shape the structure even more gently in the edge region, the flanges 11e and 12e can however also be folded in a number of steps. Flanging by a an angle which is, as a whole, larger than 45° enables the flange edges 11d and 12d to be shaped more distinctively and the joint gap to be delimited more exactly. Therefore flanging by an angle which is, as a whole, larger than 45° is also a preferred option. In such cases the respective flange is flanged preferably in two or more steps.

The flanges 11e and 12e are flanged in the same run by means of the same flanging roller—in the example embodiment, using a single flanging roller 10 in a single run. The flanging roller 10 is attached to a tool head, rotatable about a rotational axis R and either rigid or elastically flexible in the direction of the flange edges 11d and 12d. The flanging roller 10 comprises two truncated conical axial portions which abut each other in the axial centre of the flanging roller 10 via their large end faces of equal diameter and, encircling this, form a tip which protrudes in the shape of an arrow. The outer circumference of the flanging roller 10 comprises a correspondingly shaped flanging area comprising one half, on the left in FIG. 5, which rolls off on the flange 11e, and one half, on the right in FIG. 5, which rolls off on the flange 12e.

The contoured bodies 13 and 14 each have a surface facing the flanging roller 10 and parallel to the facing half of the flanging roller 10 in every cross-section along the flange edge 11d or 12d, in order to form the bearing surface for the respective flange 11e or 12e. The edges 13' and 14' preferably exhibit only a slight distance from the sheet metal region of the fixed sheet metal part 11 or 12 respectively adjacent to the joining regions 11c and 12c, in order to keep the distance between the flange edges 11d and 12d and the edge at which the joining region 11c or 12c respectively deviates from the other sheet metal region small.

Once flanged, the sheet metal parts 11 and 12—which remain unaltered in the joining position—are welded to each other along the flange edges 11d and 12d. During welding, a uniform welding seam 17 connecting the sheet metal parts 11 and 12 fixedly to each other is produced in the joint gap between the flange edges 11d and 12d. The welding is performed using a laser welding tool, as in the first example embodiment.

Figure 7:
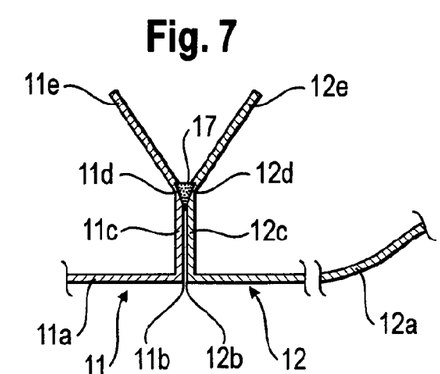
FIG. 7 the composite of the second example embodiment as such, in cross-section.

FIG. 7 shows the composite 11, 12, 17 of the second embodiment in the vicinity of the connecting seam 17. In the cross-sectional profile the flanges 11e and 12e form a funnel with the seam 17 at the tip of the funnel, as already mentioned. The joining regions 11c and 12c and the flanges 11e and 12e together are Y-shaped in the cross-sectional profile.

In a preferred application, each of the composite of sheet metal parts 1, 2, 7 of the first example embodiment and the composite of sheet metal parts 11, 12, 17 of the second example embodiment is part of an outer shell of a vehicle, preferably an automobile. The composites can be part of an attachment, for example a door or hatchback, or also a partial region of the autobody metal sheet, for example a fixedly assembled rear part, each in its own or both together. Since their shape is curved around a plurality of axes, such shell structures are in many cases assembled from partial structures. In the preferred application, each of the sheet metal parts 1 and 2 on the one hand and the sheet metal parts 11 and 12 on the other is such a partial structure.

The regions of the peripheral joining regions 1c and 2c from which the flanges 1e and 2e deviate in the flange edges 1d and 2d, and the adjacent sheet metal regions 1a and 2a of the sheet metal parts 1 and 2 of the first example embodiment, point outwards on the vehicle, i.e. are visible from the outside. Accordingly, the welding seam 7 can also be seen from the outside. Visible areas must be at least optically immaculate for the user. This demand is met by the welding seam 7 by preparing the flanges by flanging, since the well-defined, exactly reproducible joint gap associated with this is better than welding seams placed on flange edges shaped in a press. The welding seam 7 can be covered with a joint compound, as is customary with outer seams in the manufacture of vehicles, before it is for example painted.

In the second example embodiment, the welding seam 17 is produced, advantageously, in an inner region which is non-critical or at least less critical with respect to the optical appearance and not visible on the vehicle from the outside. Viewed from the outside, the welding seam 17 lies behind the narrowly adjacent outer edges or transitions 11b and 12b at which the peripheral joining regions 11c and 12c deviate from the adjacent sheet metal region 11a and 12a of the respective sheet metal part 11 and 12. The seam is a hidden seam 17. The adjacent sheet metal regions 11a and 12a are visible on the vehicle from the outside, i.e. they are outer shell regions of a vehicle. If, as is preferred, the joining regions 11c and 12c abut each other between their respectively outer edge 11b and 12b and the flange edges 11d and 12d, this even more reliably protects them from sight. On the other hand, preparing the flanges by flanging in accordance with the invention assists in producing the welding seam 17 to a uniformly high quality over the entire length or, if the quality demands are reduced, promotes a higher welding speed. The joint gap between the outer edges of the joining regions 11c and 12c can be filled with a joint compound, before the sheet metal parts 11 and 12 are for example painted on the outside. The outer shell regions 11a and 12a are facing to the same side. The outer shell region 11a extends the outer shell region 12a continuously with a smooth transition over the bent transitions 11b and 12b.

By roll-flanging, in particular by roll-flanging around a shaping edge 3', 4', 13' or 14' of a contoured body 3, 4, 13, 14, flange edges 1d, 2d, 11d and 12d can be shaped with an advantageously very small curvature radius and to a high level of reproducibility. The flange edges are preferably bent sharply, such that they comprise an outer tip which runs almost linearly in the longitudinal direction of the respective flange 1e, 2e, 11e or 12e, i.e. almost punctiform in cross-section. The joint gap remaining between the flange edges 1d and 2d or the flange edges 11d and 12d in the joining position is therefore defined with high precision and can be advantageously narrow.

The contoured bodies 3 and 4 and the contoured bodies 13 and 14 are stationary relative to the respectively fixed sheet metal part 1, 2, 11 or 12. They can, however, be replaced by contoured bodies which move together with the respectively assigned flanging roller, in particular respectively replaced by a counter roller for the assigned flanging roller. In such embodiments, the sheet metal parts are fixed differently in the processing position or directly in the joining position. The contoured body, preferably a counter roller, which is respectively moved together with the assigned flanging roller advantageously forms an edge, around which the flange is folded, which is moved synchronously with the flanging roller during flanging.

The welding connection can be replaced by a soldering connection if the demands on the stability of the composite of sheet metal parts 1, 2, 7 or 11, 12, 17 allow this. It is merely necessary to use an added material, the melting temperature of which is sufficiently far apart from that of the sheet metal material that the sheet metal material does not yet melt to any significant extent at the melting temperature of the added material.

Figure 8:
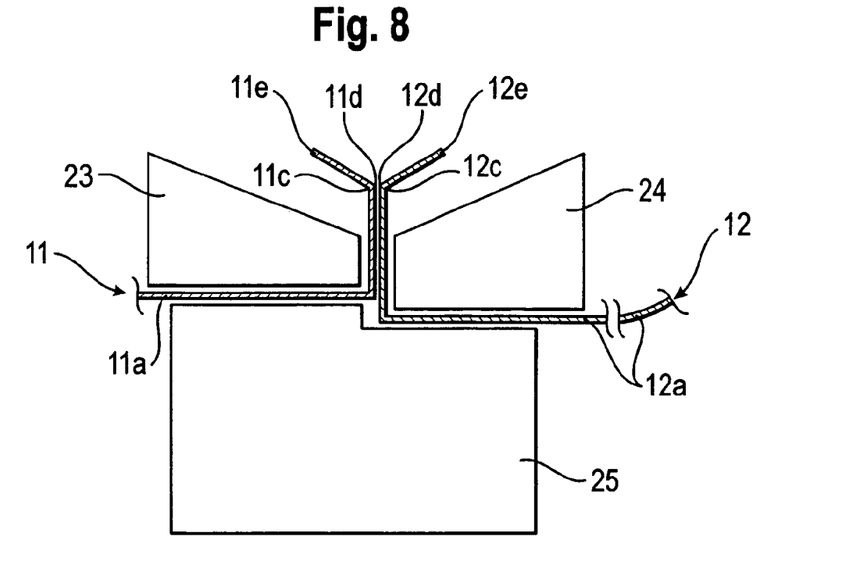
FIG. 8 two sheet metal parts for a composite of sheet metal parts of a third example embodiment, each fixed in a joining position for welding.

FIG. 8 shows the manufacture of a composite of sheet metal parts 11 and 12, in a third example embodiment in which the sheet metal parts 11 and 12 have been shaped to their final shape in a press, for example by deep-drawing or embossing or the like. The flange edges 11d and 12d and the flanges 11e and 12e have also been shaped in the press, i.e. the shaping has completely been performed in a one-step operation.

The fixing tool of the third example embodiment comprises a fixing body 23 for the first sheet metal part 11, a fixing body 24 for the second sheet metal part 12 and a single counter support 25 for both fixing bodies 23 and 24. The sheet metal parts 11 and 12 are clamped in the shown joining position in the respective shell region 11a and 12a between the associated one of the fixing bodies 23 and 24 and the common counter support 25. As in the other example embodiments, the fixing bodies 23 and 24 are also clamping the joining regions 11c and 12c. Between the already shaped flanges 11e and 12e and the surface of the associated one of the fixing bodies 23 and 24 remains a narrow gap which compensates for the tolerances associated with the shaping process of the third example embodiment. On the other hand, the joining regions 11c and 12c are stiffened by the flange edges 11d and 12d and the flanges 11e and 12e shaped in accordance with the invention. The enhanced stiffness, on its own, is advantageous for the precision in which the connecting seam can be produced. The welding is performed as in the other example embodiments.

The single counter support 25 which may be in one piece or in several pieces fixedly connected to each other is also an alternative option for the other embodiments where it may replace the counter supports 15 and 16 or the not shown counter supports of the first example embodiment. Also, splitting the counter support 25 into two separate counter supports which can be moved relative to each other is an alternative option for the third example embodiment.

Figure 9:
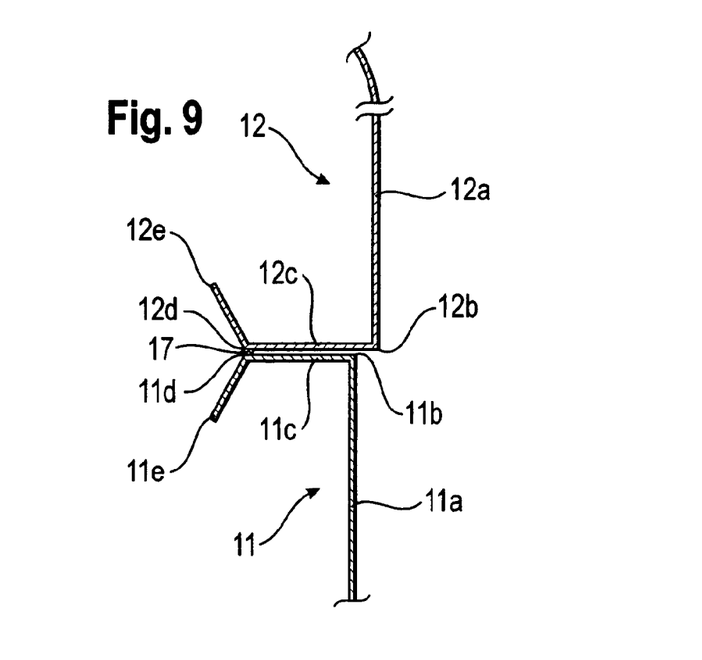
FIG. 9 the composite of the third example embodiment as such, in cross-section.

FIG. 9 shows the composite 11, 12, 17 of the third example embodiment. In this embodiment, the heights of the opposing areas of the joining regions 11c and 12c are different from each other. The height is measured from the respective transition 11b or 12b which again have only a small radius of curvature, like an edge, to the seam 17. The flange edges 11d and 12d and flanges 11e and 12e are understood, as should be mentioned again, as part of the respective one of the joining regions 11c and 12c. Because of the different heights a step-like transition is formed between the shell regions 11a and 12a. Thereby a deepening or recess is created which may be used for accommodating an attachment part, preferably a shallow, plate-like attachment part. If the composite 11, 12, 17 is, for example, an automobile hatchback or part of a hatchback, a number-plate can be disposed in the deepening obtained by the stepped transition between the shell regions 11a and 12a. The stepped transition aids also in hiding the connection of the sheet metal parts 11 and 12. FIG. 9 shows the composite 11, 12 and 17 with the first sheet metal part 11 forming a lower part and the second sheet metal part 12 forming an upper part of the outer shell of a vehicle.

Figure 10:
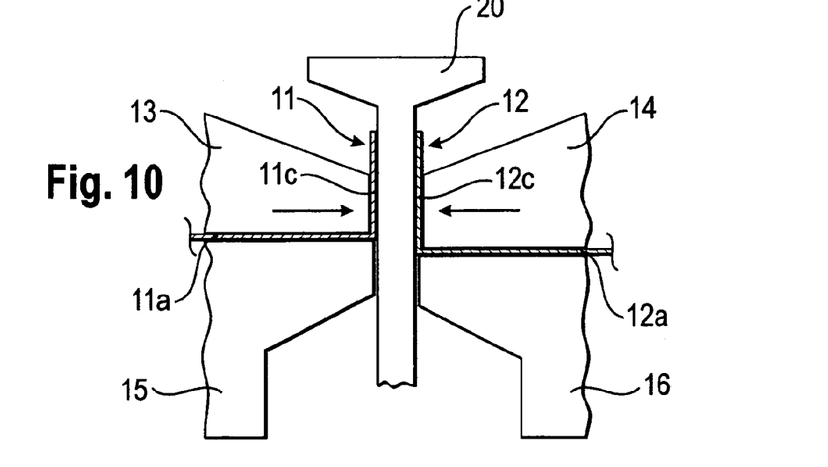
FIG. 10 two sheet metal parts for a composite of sheet metal parts of a fourth example embodiment, each fixed in a flanging position for flanging.
Figure 11:
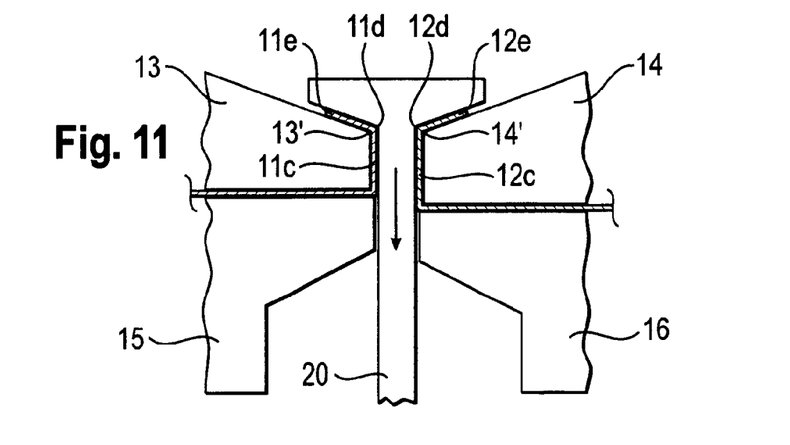
FIG. 11 the sheet metal parts of the fourth example embodiment in the flanging position and after flanging.
Figure 12:
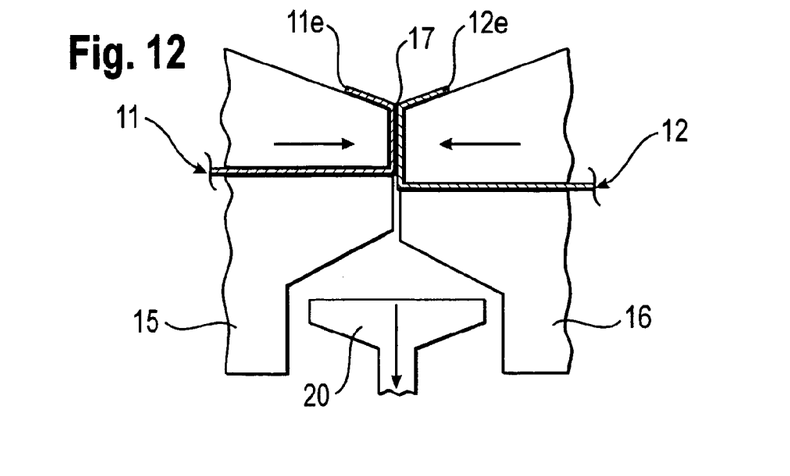
FIG. 12 the flanged sheet metal parts in the joining position.

FIGS. 10 to 12 show the manufacture of the composite 11, 12 and 17 according to a fourth example embodiment. In this example the sheet metal parts 11 and 12, which are as such the same as in the third example embodiment, are shaped in a process of plastic deformation in a press, for example by deep-drawing or embossing, similar to the sheet metal parts 11 and 12 of the second example embodiment, i.e. the flanges for the seam to be created are not shaped in the press but in a subsequent, extra flanging step. The flanging, however, is not by means of a flanging element moving in the longitudinal direction of the flange edge or edges to be shaped, but transversely to this direction. The longitudinally moving flanging element or elements of the first and second example embodiments are replaced by a flanging element 20 which constitutes a flanging die which is movable relative to the fixed sheet metal parts 11 and 12 only in a direction transverse to the longitudinal direction of the flange edges to be shaped.

In FIG. 10, the first sheet metal part 11 is clamped between the contoured body 13 and the counter support 15, and the second sheet metal part 12 is clamped between the contoured body 14 and the counter support 16, comparable to the second example embodiment. The contoured bodies 13 and 14 are movable, each jointly together with its associated counter support 15 or 16, relative to each other in a first direction transverse to the longitudinal direction of the flange edges to be shaped. The whole fixing assembly comprising the contoured bodies 13 and 14 and the counter support 15 and 16 is fixed to an actuator, for example to the end of a robot arm, to be movable jointly together and relative to each other in said first transversal direction. The first transversal direction is indicated by arrows.

The flanging element 20 is part of a flanging tool comprising a support for the flanging element 20, which supports the flanging element 20 movably in a second direction transverse to the longitudinal direction of the flange edges to be shaped. The flanging element 20 projects from its support towards a flanging head formed at the free end of the projecting part. The flanging head tapers from the free end of the flanging element 20 towards the projecting part, in the example embodiment at a constant angle. For flanging, the sheet metal parts 11 and 12 are fixed each on its own by the fixing tool. Both fixing tools 13 and 15 on the one and 14 and 16 on the other hand are jointly moved into the flanging position shown in FIG. 10 by moving the fixing assembly over the flanging head of the flanging element 20 and against the support of the flanging tool. After the clamped sheet metal parts 11 and 12 have passed the flanging head of the flanging element 20, with the counter supports 15 and 16 already in contact with the support of the flanging tool, the fixing tools 13, 15 and 14, 16 are moved in the first transversal direction towards each other and the side surfaces of the projecting part of the flanging element 20. The projecting part of the flanging element 20 follows the course of the flange edges to be formed. The same is true for the two tapering surfaces of the flanging head which face towards the counter bearing surface of the respective contoured body 13 or 14. FIG. 10 shows the sheet metal parts 11 and 12 in this flanging position ready for performing the flanging step by moving the flanging element 20 with its flanging head towards the counter bearing surfaces of the contoured bodies 13 and 14. The tapering surfaces of the flanging head face the counter bearing surfaces of the contoured bodies 13 and 14 and run parallel to these counter bearing surfaces. The joining regions 11c and 12c abut the side surfaces of the projecting part of the flanging element 20, but allow for relative movement of the flanging element 20 in the second transversal direction, which is perpendicular to the first transversal direction in the example embodiment.

For flanging the flanging element 20 is moved relative to its support and relative to the sheet metal parts 11 and 12 which are also supported, in the flanging position, via the fixing tools 13, 15 and 14, 16 by the support of the flanging tool. This transversal movement of the flanging element 20 is indicated in FIG. 11 by the arrow pointing towards the support of the flanging element 20. The joining regions 11c and 12c are flanged around the contoured edges 13' and 14' of the contoured bodies 13 and 14 and pressed onto the counter bearing surface of the respective contoured body 13 or 14. Subsequent to flanging, the fixing tools 13, 15 and 14, 16 are moved away from each other in the first transversal direction to allow the flanging element 20 to pass between the joining regions 11c and 12c.

When the fixing tools 13, 15 and 14, 16 have been moved free of the flanging element 20 the fixing tools and therewith the flanged and still clamped sheet metal parts 11 and 12 are moved into the joining position for welding. In the joining position, as shown in FIG. 12, the joining regions 11c and 12c abut each other, as in the other example embodiments, in particular the third example embodiment, and are finally welded to form the connecting seam 17.

Figure 13:
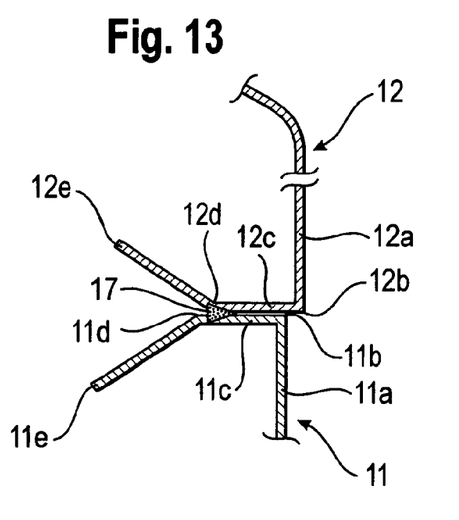
FIG. 13 a composite, in cross-section, in which a welding seam runs only along one of the flange edges of the sheet metal parts.

In FIG. 13 a composite 11, 12, 17 is shown, in which the connecting seam 17 runs along the flange edge 11d of the first sheet metal part 11. The flange edge 12d of the second sheet metal part 12 is a short distance offset to the flange edge 11d, in the direction parallel to the area of the joining region 11c adjacent to the bent transition 11b. The seam 17 is accordingly at the same distance offset to the flange edge 12d, in the example embodiment running parallel alongside the flange edge 12d. The cross-sectional shape of the composite 11, 12, 17 of the embodiment of FIG. 13 is identical to that of the embodiment of FIG. 9, except for the offset of the flange edges 11d and 12d relative to each other.

Figure 14:
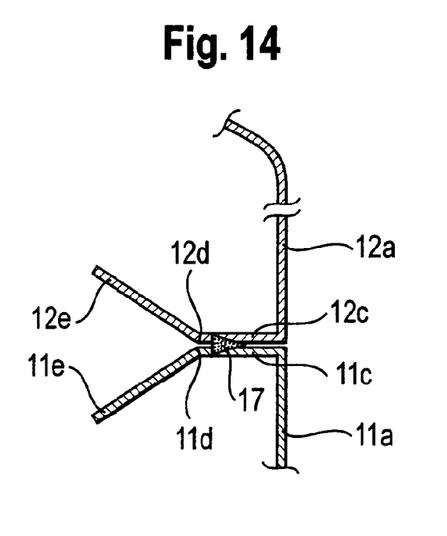
FIG. 14 a composite, in cross-section, in which the welding seam runs in a distance from both flange edges.

The composite shown in FIG. 14 has a seam 17 which runs in the joining regions 11c and 12c between the bent transitions 11b and 12b on the one and the flange edges 11d and 12d on the other side. The distance to the transitions 11b and 12b is greater than the distance to the flange edges 11d and 12d.

Figure 15:
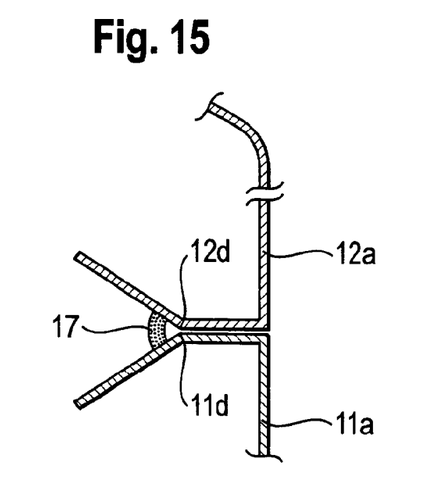
FIG. 15 a composite, in cross-section, in which the welding seam runs inside from the flange edges bridging from one flange to the other.

In the embodiment of FIG. 15 the connecting seam 17 runs in the area of the two flanges 11e and 12e and does not contact the flange edges 11d and 12d, at least not in the cross-section shown.

Figure 16:
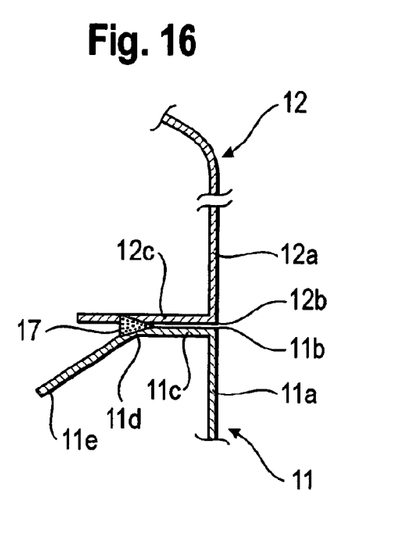
FIG. 16 a composite, in cross-section, in which a flange edge is formed only in the joining region of one of the sheet metal parts.
Figure 17:
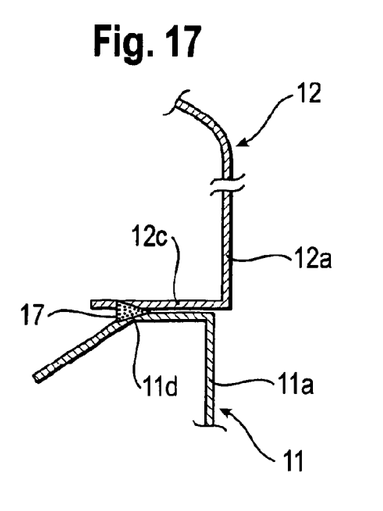
FIG. 17 a composite, in cross-section, in which a flange edge is formed only in the joining region of one of the sheet metal parts.
Figure 18:
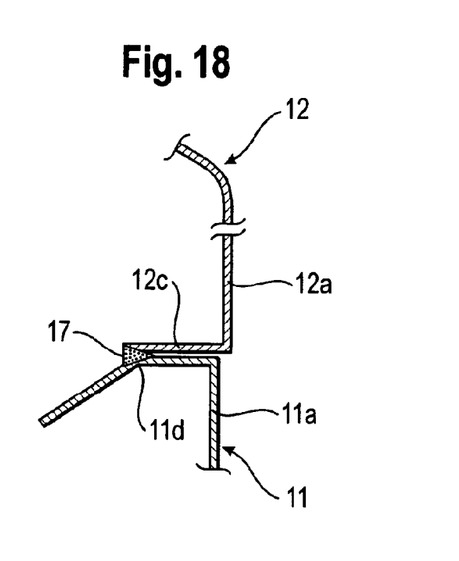
FIG. 18 a composite, in cross-section, in which a flange edge is formed only in the joining region of one of the sheet metal parts.
Figure 19:
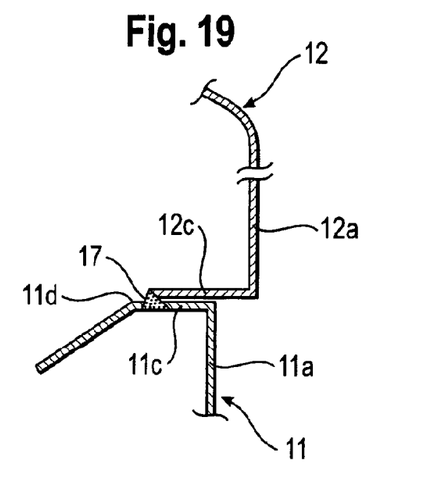
FIG. 19 a composite, in cross-section, in which the sheet metal parts are connected by a fillet seam on a lap joint of the joining regions.

The FIGS. 16 to 19 show embodiments in which only the first sheet metal part 11 has a flange edge 11d and a flange 11e projecting therefrom whereas the second sheet metal part 12 has the bent transition 12b but no further flange edge in its joining region 12c. The sheet metal parts in FIG. 16 and FIG. 17 are identical as such. The composites differ only with respect to a cross-sectional offset of the two sheet metal parts 11 and 12 relative to each other. In FIG. 16 the outer shell regions 11a and 12a extend each other continuously over the abutment whereas the sheet metal parts 11 and 12 in FIG. 17 form a stepped transition as briefly explained, for example, with respect to FIG. 9. In FIG. 18 the second sheet metal part 12 has a joining region 12c which ends just at the height of the flange edge 11d of the first sheet metal part 11. The seam 17 runs along the flange edge 11d, as in the embodiments of FIGS. 16 and 17, and furthermore also along the peripheral end of the joining region 12c of the second sheet metal part 12. In the example embodiment of FIG. 19 the joining region 12c ends in a distance from the flange edge 11d, so the joining region 11c overlaps the joining region 12c towards the inside of the composite. The connecting seam 17 is a fillet weld in the lap joint of the joining regions 11c and 12c.

Figure 20:
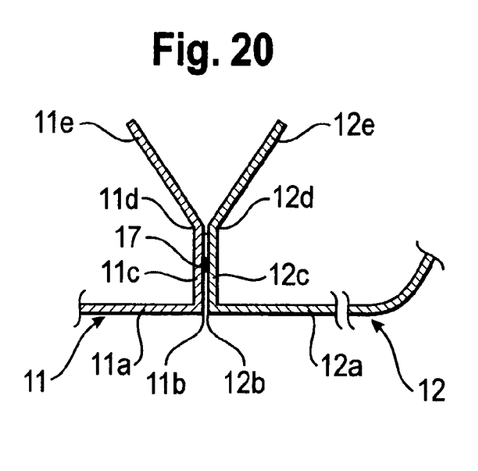
FIG. 20 a composite, in cross-section, in which the seam is wound.
Figure 21:
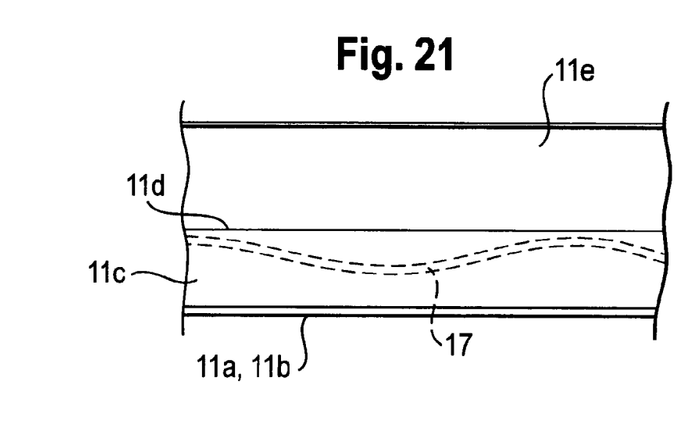
FIG. 21 the composite of FIG. 20, in a side-view.

FIG. 20 shows a composite 11, 12 and 17 in which the seam 17 is wound and runs alongside the flange edges 11d and 12d towards and away from the bent transitions 11b and 12b. The seam 17 may run in a regular or irregular winding, for example zigzagging or sinusoidal as shown in FIG. 21 which shows the composite of FIG. 20 in a side-view onto the first sheet metal part 11.

The invention claimed is:

1. A joining method for joining sheet metal parts to a composite, the composite forming part of an outer shell of a vehicle when assembled onto the vehicle, in which method:
   a) a first sheet metal part having a first outer shell region and a first joining region which projects from the first outer shell region via a bent transition towards an inner side of the first sheet metal part and
   b) a second sheet metal part having a second outer shell region and a second joining region which projects from the second outer shell region towards an inner side of the second sheet metal part are fixed relative to each other in a joining position;
   c) and the sheet metal parts are connected to each other in the joining position by welding or soldering, thereby producing a welding or soldering seam such that the joining regions form a gap and abut each other along a strip, wherein the strip runs between the bent transition of the first sheet metal part and the welding or soldering seam; wherein d) a flange edge and a flange are shaped in the first joining region, the flange projecting along the flange edge from an adjacent area of the first joining region;

e) the sheet metal parts are connected to each other such that the welding or soldering seam runs in the first joining region along or alongside the flange edge, and wherein f) the first sheet metal part is fixed in a first fixing tool for flanging and the second sheet metal part is fixed in a second fixing tool and said two sheet metal parts are fixed in the joining position by the first and second fixing tools without re-fixing said two sheet metal parts.

2. The joining method according to claim 1, wherein the flange is flanged by pressing a flanging element onto the flange and moving the flanging element relative to the first sheet metal part in a longitudinal direction of the flange or transversely to the longitudinal direction, folding the flange around the flange edge.

3. The joining method according to claim 1, wherein the flange is flanged by means of a flanging roller forming the flanging element.

4. The joining method according to claim 2, wherein the flange is flanged by means of a flanging die forming the flanging element, the flanging element extending along at least a greater part of the length of the flange edge.

5. The joining method according to claim 1, wherein the flange is flanged around an edge of a contoured body.

6. The joining method according to claim 2, wherein the flange is pressed against a contoured body during flanging.

7. The joining method according to claim 6, wherein the first sheet metal part is fixed in the joining position by means of the contoured body.

8. The joining method according to claim 6, wherein the contoured body is stationary relative to the first sheet metal part during flanging and comprises an edge, the course of the edge following the course of the flange edge to be formed.

9. The joining method according to claim 6, wherein the contoured body is moved along the flange together with the flanging element during flanging, such that the flange is clamped in a gap between the flanging element and the contoured body.

10. The joining method according to claim 1, wherein the sheet metal parts are not fixed in the joining position relative to each other until after flanging.

11. The joining method according to claim 1, wherein the sheet metal parts are already fixed in the joining position relative to each other during flanging.

12. The joining method according to claim 1, wherein a second flange is also flanged around a flange edge on the second sheet metal part at a periphery of the second sheet metal part, the course of said second flange following the course of the flange edge of the first sheet metal part in the joining position.

13. The joining method according to claim 12, wherein the flanges of the sheet metal parts are flanged away from each other around the flange edges using the same flanging tool, and in the same run or working cycle of the flanging tool.

14. The joining method according to claim 1, wherein the first sheet metal part is fixed in the joining position by means of a fixing tool during flanging, and welding or soldering is performed while the fixation is maintained.

15. The joining method according to claim 1, wherein at least one of the sheet metal parts comprises a peripheral joining region which is angled away, and in that the flange is folded by flanging within the joining region.

16. The joining method according to claim 1, wherein the flange is folded in only one step or is folded by a first angle in a first step and folded further by a second angle in a second, subsequent step.

17. The joining method according to claim 1, wherein the sheet metal parts are used for an outer shell of a vehicle and, when assembled in the vehicle, form an outer visible area.

18. The joining method according to claim 17, wherein the sheet metal parts are fixed in the joining position such that the flange edge of the first sheet metal part which has already been shaped or is still to be shaped is short of the visible area, and in that a welding or soldering seam which is short of the visible area and not visible from the outside is produced along the flange edge by welding or soldering.

19. The joining method according to claim 15, wherein the flange is folded in the same angular direction as the joining region and projects from an adjacent region of said at least one of the sheet metal parts, as viewed in cross-section.

* * * * *

UNITED STATES PATENT AND TRADEMARK OFFICE
CERTIFICATE OF CORRECTION

PATENT NO. : 8,631,996 B2  Page 1 of 1
APPLICATION NO. : 12/523559
DATED : January 21, 2014
INVENTOR(S) : Quell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1181 days.

Signed and Sealed this
Twenty-second Day of September, 2015

Michelle K. Lee
*Director of the United States Patent and Trademark Office*